(12) United States Patent
Perrin et al.

(10) Patent No.: US 11,817,224 B2
(45) Date of Patent: Nov. 14, 2023

(54) EQUIPMENT FOR PRODUCING NUCLEAR FUEL POWDER

(71) Applicant: FRAMATOME, Courbevoie (FR)

(72) Inventors: Serge Perrin, Valloire (FR); Pascal Rouquette, Montségur-sur-Lauzon (FR)

(73) Assignee: FRAMATOME, Courbevoie (FR)

(*) Notice: Subject to any disclaimer, the term of this patent is extended or adjusted under 35 U.S.C. 154(b) by 245 days.

(21) Appl. No.: 17/282,935

(22) PCT Filed: Oct. 9, 2018

(86) PCT No.: PCT/FR2018/052498
§ 371 (c)(1),
(2) Date: Apr. 5, 2021

(87) PCT Pub. No.: WO2020/074793
PCT Pub. Date: Apr. 16, 2020

(65) Prior Publication Data
US 2021/0391093 A1 Dec. 16, 2021

(51) Int. Cl.
*G21C 21/00* (2006.01)
*C01G 43/025* (2006.01)
(Continued)

(52) U.S. Cl.
CPC .............. *G21C 21/00* (2013.01); *B01J 12/02* (2013.01); *B01J 19/00* (2013.01); *C01B 13/22* (2013.01); *C01G 43/025* (2013.01)

(58) Field of Classification Search
CPC ........... G21C 21/00; B01J 12/02; B01J 19/00; C01B 13/22; C01G 43/025
(Continued)

(56) References Cited

U.S. PATENT DOCUMENTS

| 3,925,965 A | 12/1975 | Rushworth |
| 4,112,055 A | 9/1978 | Artaud |
| 6,136,285 A | 10/2000 | Feugier |

FOREIGN PATENT DOCUMENTS

| EP | 0148707 A2 | 7/1985 |
| FR | 3015461 A1 * | 6/2015 |

OTHER PUBLICATIONS

Corresponding Search Report for PCT/FR2018/052498.

* cited by examiner

*Primary Examiner* — Steven J Bos
(74) *Attorney, Agent, or Firm* — Davidson, Davidson & Kappel, LLC

(57) ABSTRACT

A nuclear fuel powder production plant comprises a conversion installation (2) for the conversion of uranium hexafluoride ($UF_6$) into uranium dioxide ($UO_2$) having a hydrolysis reactor (4) for the conversion of $UF_6$ into uranium oxyfluoride powder ($UO_2F2$) and a pyrohydrolysis furnace (6) for converting the $UO_2F2$ powder into $UO_2$ powder. The nuclear fuel powder production plant also includes a packaging unit (20) for the $UO_2$ powder comprising a filling station (22) having a chamber (26) for receiving a container (24) to be filled, a filling duct (28) supplied from the furnace (6) and a suction system (32) comprising a suction ring (34) disposed at the outlet (30) of the filling duct (28) for sucking an annular air flow (A) around a stream (P) of $UO_2$ powder falling from the outlet (30) from the filling duct (28) into the container (24).

19 Claims, 5 Drawing Sheets

(51) Int. Cl.
*B01J 12/02* (2006.01)
*B01J 19/00* (2006.01)
*C01B 13/22* (2006.01)

(58) Field of Classification Search
USPC .......................................................... 423/260
See application file for complete search history.

EQUIPMENT FOR PRODUCING NUCLEAR FUEL POWDER

The present disclosure relates to the field of the production of uranium dioxide ($UO_2$) powder, intended in particular for the manufacture of $UO_2$ pellets for nuclear fuel rods.

BACKGROUND

It is possible to enrich uranium in the form of uranium hexafluoride ($UF_6$). However, it is then necessary to convert $UF_6$ to $UO_2$ to make $UO_2$ pellets.

To do this, it is possible to convert gaseous $UF_6$ into uranium oxyfluoride ($UO_2F_2$) by hydrolysis in a reactor, by injecting gaseous $UF_6$ and dry water vapor into the reactor to obtain $UO_2F_2$ powder, then converting the $UO_2F_2$ powder into $UO_2$ powder by pyrohydrolysis in an furnace, circulating the $UO_2F_2$ powder in the furnace and injecting dry water vapor and hydrogen ($H_2$) gas into the furnace.

U.S. Pat. No. 6,136,285 discloses an installation for converting $UF_6$ to $UO_2$ comprising a hydrolysis reactor and a pyrohydrolysis furnace for the implementation of such a conversion method.

The $UO_2$ powder obtained must be packaged so that it may be transferred and used for the manufacture of nuclear fuel pellets. However, $UO_2$ powder is volatile and may easily disperse into the atmosphere and contaminate the $UF_6$ to $UO_2$ conversion installation.

For reasons of radiological cleanliness and the safety of operators working on the conversion installation, the risk of dispersion of fissile material needs to be limited.

SUMMARY

One of the aims of the present disclosure is to provide an installation for the production of nuclear fuel powder which makes it possible to limit the risks of contamination with uranium.

To this end, the present disclosure provides an installation for the production of nuclear fuel powder comprising
an installation for the conversion of uranium hexafluoride ($UF_6$) into uranium dioxide ($UO_2$), the conversion installation comprising:
  a hydrolysis reactor for the conversion of $UF_6$ into uranium oxyfluoride powder ($UO_2F_2$) by reaction between gaseous $UF_6$ and dry water vapor injected into the reactor; and
  a pyrohydrolysis furnace for converting the d'$UO_2F_2$ powder into $O_2$ powder by reacting the d'$UO_2F_2$ powder with dry water vapor and hydrogen ($H_2$) gas circulating in the furnace; and
a packaging unit for the $UO_2$ powder, the packaging unit comprising a station for filling a container with $UO_2$ powder, the filling station comprising a containment chamber, a filling duct supplied with $UO_2$ powder from the furnace and having an outlet opening into the containment chamber, and a suction system comprising a suction ring disposed at the outlet of the filling duct for sucking an annular air flow around a stream of $UO_2$ powder falling from the outlet of the filling duct into the container.

According to particular embodiments, the conversion installation may comprise one or more of the following optional characteristics, taken individually or in any technically feasible combination:

the filling station comprises a ventilation system to depressurize the containment chamber and suck and filter the air present in the chamber;

the containment chamber is a cabin comprising a door for introducing or extracting the container into or out of the cabin;

it comprises an alarm system comprising a sensor arranged in the containment chamber to measure the pressure in the containment chamber and an alarm to emit an alarm signal in the event of overpressure inside the containment chamber;

the chamber is equipped with a radioactive contamination control device placed in the chamber to carry out contamination control inside the containment chamber;

it comprises at least two $UO_2$ powder storage jars and a distributor for distributing the $UO_2$ powder successively to the storage jars, the filling duct being supplied successively from the storage jars;

the distributor has a tank with a flat bottom and at least one scraper for scraping the bottom of the tank;

the distributor comprises outlet openings for the $UO_2$ powder in the bottom of the tank, each outlet opening supplying a respective storage jar;

It comprises a neutral gas injection device designed to inject neutral gas inside the distributor;

it comprises a turning station for turning and emptying a container filled with $UO_2$;

the turning station comprises a suction system comprising a suction ring arranged to be disposed near an inlet opening of a container returned by the turning station;

the turning station comprises a frame, a container holder for gripping a container, at least one lifting arm pivotally mounted on the frame and carrying the container holder, and a turning mechanism for controlling rotation of the container holder by relative to the lifting arm, the turning mechanism being so designed that rotation of the lifting arm relative to the frame causes the container holder to rotate relative to the lifting arm;

the turning mechanism comprises a first pinion rotatably mounted on the lifting arm while being rotatably secured to the frame, a second pinion rotatably mounted on the lifting arm while being rotatably secured to the container holder, and a drive mechanism connecting the first pinion to the second pinion;

the turning station comprises a blocking device disposed on the frame to block the container in the inverted position;

the turning station comprises a presence sensor for detecting the presence of the container in the inverted position, the container comprising an opening system for opening or closing the container, the turning station being designed to open the opening system only when the presence of the container in the inverted position is detected by the presence sensor;

it comprises a seal disposed at the inlet of the furnace, a seal disposed at the outlet of the furnace and/or a seal disposed between the reactor and a transfer device designed to transfer the $UO_2F_2$ powder from the reactor to the furnace, the installation being designed for pressurizing the or each seal with an inert gas;

it is designed for the injection of a neutral gas into the reactor for carrying out the conversion of $UF_6$ into $UO_2F_2$ powder under a neutral gas atmosphere; and the neutral gas is nitrogen ($N_2$).

BRIEF SUMMARY OF THE DRAWINGS

The present disclosure and its advantages will be better understood upon reading the following description, given solely by way of example, and made with reference to the accompanying drawings, in which.

DETAILED DESCRIPTION

Figure 1:
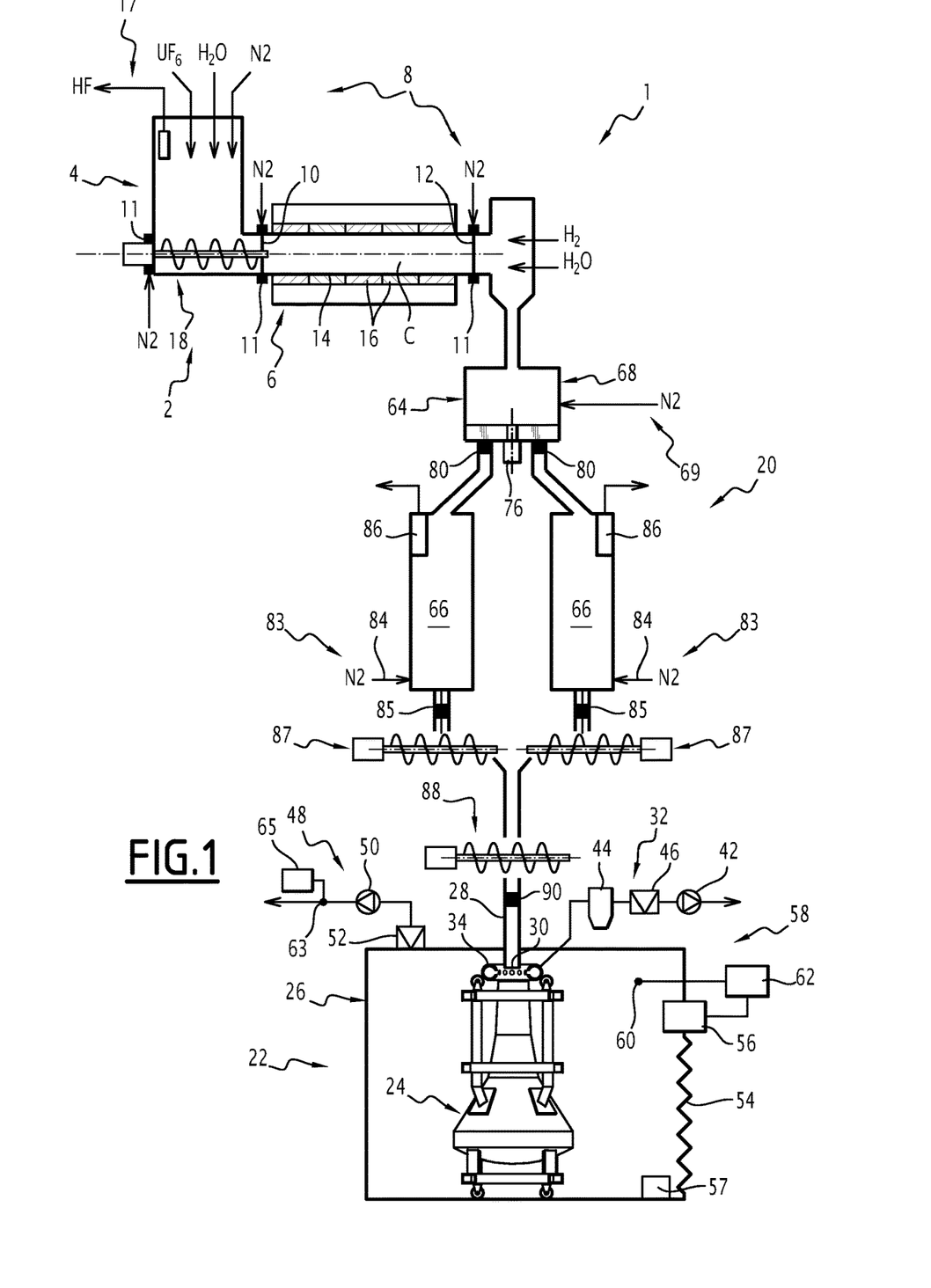
FIG. 1 is a schematic view of an installation for the production of nuclear fuel powder.

As shown in FIG. 1, the nuclear fuel powder production plant 1 comprises a conversion installation 2 designed for the conversion of $UF_6$ to $UO_2$.

The conversion installation 2 comprises a hydrolysis reactor 4 for converting $UF_6$ into $UO_2F_2$ powder, by reaction between gaseous $UF_6$ and dry water vapor ($H_2O$) injected into the reactor 4.

The conversion installation 2 comprises a pyrohydrolysis furnace 6 for converting the $UO_2F_2$ powder into $UO_2$ powder by reacting the $UO_2F_2$ powder with dry water vapor ($H_2O$) from pyrohydrolysis and $H_2$ gas injected into the furnace 6.

The conversion installation 2 comprises a supply device 8 designed to inject reactive gases ($UF_6$ gas, dry water vapor and $H_2$ gas) into the reactor 4 and into the furnace 6.

The supply device 8 is further designed to inject an inert gas into the reactor 4 so that the conversion of $UF_6$ to $UO_2$ takes place under a neutral gas atmosphere. The neutral gas is preferably nitrogen ($N_2$).

The $UF_6$ and dry water vapor injected into reactor 4 form a $UO_2F_2$ powder which falls to the bottom of the reactor 4.

The furnace 6 comprises an inlet 10 connected to the reactor 4 to receive the $UO_2F_2$ powder and an outlet 12 to deliver the $UO_2$ powder.

The conversion installation 2 comprises seals 11 at the level respectively of the inlet 10 of the furnace 6 and of the outlet 12 of the furnace 6, to provide a seal at the inlet 10 of the furnace 6 and at the outlet 12 of the furnace 6.

The furnace 6 is a continuous furnace designed so that the $UO_2F_2$ powder advances into the furnace 6 from the inlet 10 to the outlet 12 while being exposed to dry water vapor ($H_2O$) and $H_2$ gas injected into the furnace.

The conversion installation 2 is here designed for the circulation of the dry water vapor ($H_2O$) and the gaseous $H_2$ injected into the furnace 6 against the current of the $UO_2F_2$ powder, i.e. from the outlet 12 towards the 'inlet 10. The supply device 8 is designed for the injection of the dry water vapor ($H_2O$) and the gaseous $H_2$ into the furnace 6 through the outlet 12 of the furnace 6.

The furnace 6 comprises a rotary drum 14 extending along a central axis C and having a first end and an opposite second end respectively forming the inlet 10 and the outlet 12. The drum 14 is inclined so that the inlet 10 is higher than the outlet 12. In operation, due to the inclination and rotation of drum 14, the $UO_2F_2$ powder advances from the inlet 10 to the outlet 12.

The furnace 6 comprises heating elements 16 for heating the drum 14. In the example illustrated, the heating elements 16 surround the drum 14.

The conversion installation 2 comprises a recovery device 17 for recovering the excess reactive gases, the inert gas and the gaseous co-products resulting from the conversion, namely hydrogen fluoride HF.

The recovery device 17 is here disposed in the reactor 4 to recover the gases present in the reactor 4 and the gases which rise from the furnace 6 into the reactor 4 due to the countercurrent circulation of the gases in the furnace 6.

The conversion installation 2 comprises a transfer device 18 for transferring the $UO_2F_2$ powder from the bottom of the reactor 4 to the inlet 10 of the furnace 6. The transfer device 18 is here a motorized endless screw.

The conversion installation 2 comprises a seal 11 disposed to provide a seal between the transfer device 18 and the reactor 4, more precisely between the transfer device 18 and an opening of the reactor 4 through which the transfer device 18 is inserted into the reactor 4.

The conversion installation 2 is designed for pressurizing each seal 11 by continuous injection of an inert gas, preferably nitrogen ($N_2$), preferably at a pressure greater than that existing in the conversion installation 2.

The injection of a neutral gas at the level of the seals 11 disposed at the inlet 10, at the outlet 12 of the furnace and/or between the reactor 4 and the transfer device 18, at a pressure greater than that existing in the conversion installation 2 makes it possible to prevent the reactive products and the reaction products from escaping out of the conversion installation 2 and ensures the confinement of said products in the conversion installation 2.

The conversion installation 2 comprises a packaging unit 20 for packaging the $UO_2$ powder from the furnace 6.

The reactor 4 and furnace 6 are designed to operate continuously, and produce $UO_2$ powder continuously. The packaging unit 20 is designed for filling containers with the $UO_2$ powder continuously supplied by the reactor 4 and the furnace 6.

The packaging unit 20 comprises a station 22 for filling a container 24 with $UO_2$ powder.

The filling station 22 comprises a containment chamber 26, a filling duct 28 supplied with $UO_2$ powder from the furnace 6 and having an outlet 30 opening into the containment chamber 26, and a suction system 32.

Figure 2:
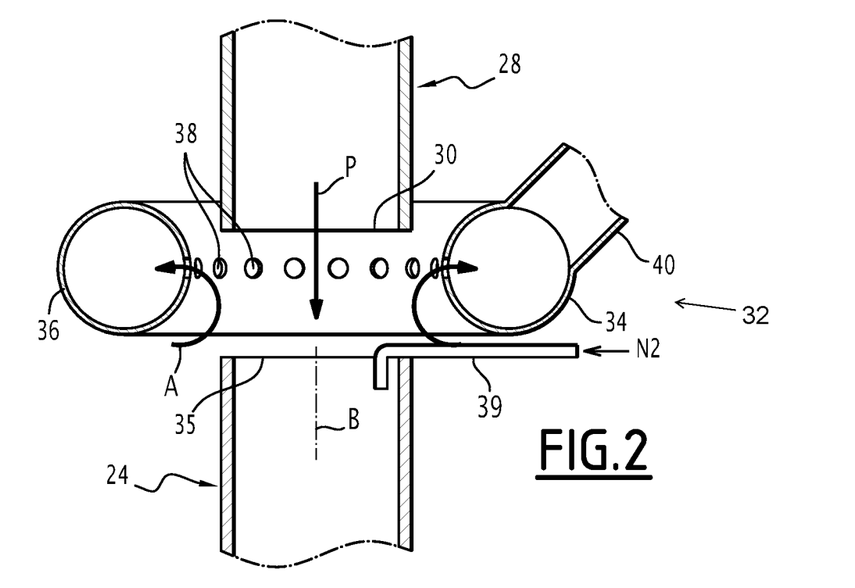
FIG. 2 is a schematic view of a detail of a filling station of the nuclear fuel powder production installation of FIG. 1, showing the system for sucking particles in suspension during filling of a container with $UO_2$ powder.

As may be seen in FIG. 2, the suction system 32 comprises a suction ring 34 disposed at the outlet 30 of the filling duct 28 to suck a flow A of annular air around a stream P of $UO_2$ powder falling from the outlet 30 of the filling duct 28 into an inlet opening 35 of the container 24.

The suction ring 34 is arranged so that the stream P of powder exiting the outlet 30 of the filling duct 28 passes through the suction ring 34. The suction ring 34 is disposed around an imaginary cylinder extending the outlet 30 of the filling duct 28.

The suction ring 34 comprises an annular tube 36 extending around a central axis B. The tube 36 has a toroidal shape. The tube 36 is provided with suction openings 38 distributed on the tube 36 around the central axis B. The suction openings 38 are arranged on a part of the wall of the tube 36 facing the inside of the suction ring 34.

The suction ring 34 comprises an outlet duct 40 connected to the tube 36.

When a suction force is generated inside the tube 36, the suction ring 34 draws an annular flow of air A.

As the $UO_2$ powder flows from the filling duct 28 to the container 24, powder particles inevitably become suspended in the surrounding air.

With an appropriate suction force generated in the suction ring 34, it is possible not to disturb the stream of the powder from the filling duct 28 into the container 24 while sucking the powder particles suspended in the air around the outlet 30 of the filling duct 28. Contamination of the surrounding air is therefore effectively limited.

Advantageously, the filling station 22 comprises a neutral gas injection duct 39 for neutralizing the container 24 before and during its filling with $UO_2$ powder. This configuration makes it possible to prevent the $UO_2$ powder from coming into contact with air and thus limits the risks of oxidation of the $UO_2$ powder and dust explosion. The injected neutral gas is for example nitrogen ($N_2$).

Returning to FIG. 1, the suction system 32 comprises a suction machine 42 for generating suction force. The suction machine 42 is connected to the outlet duct 40 of the suction ring 34 for sucking air through the suction ring 34.

The suction system 32 comprises a particle separator 44 for separating the powder particles from the air sucked by the suction ring 34. The particle separator 44 is here a cyclone separator.

The suction system 32 comprises a filter device 46 for filtering out powder particles present in the suction air.

In the example illustrated, the filtering device 46 is placed downstream of the particle separator 44 and the suction machine 42 is disposed downstream of the filtering device 46. This makes it possible to separate the particles from the air, then to filter any particles remaining in the air, thus limiting contamination of the suction machine 42.

The filling station 22 comprises a ventilation system 48 to renew the air inside the containment chamber 26 by sucking in the air present in the containment chamber 26.

The ventilation system 48 makes it possible to keep the interior of the filling station 22 in a vacuum and thus avoid any dissemination of powder to the outside of the filling station 22.

The ventilation system 48 comprises a suction machine 50 for generating a suction force for the air present in the containment chamber 26 and a filter device 52 for filtering powder particles present in the suction air.

Due to the ventilation system 48 operating by suction, any powder present in the ambient air of the containment chamber 26 is not discharged to the outside, but is sucked and filtered by the ventilation system 48.

As illustrated in FIG. 1, the containment chamber 26 is a closed cabin that defines a closed volume. As a variant, the containment chamber 26 is a hood.

The containment chamber 26 comprises an access door 54 whose opening allows a container 24 to be introduced into or extracted out of the chamber 26.

The filling station 22 comprises a door control system 56 for automatically controlling the opening and closing of the door 54.

The containment chamber 26 is preferably equipped with a radioactive contamination control device 57 disposed in the lower part of the containment chamber 26 to carry out a control inside the containment chamber 26 and in particular to detect possible contamination with fissile material. The radioactive contamination control device 57 comprises, for example, an alpha radiation detector and/or a device for taking a sample of the atmosphere present in the containment chamber 26 and measuring its radioactivity.

The containment chamber 26 may further be equipped with an alarm system 58 comprising a sensor 60 disposed inside the containment chamber 26 to measure the pressure therein. The alarm system 58 comprises an alarm 62 to emit an alarm signal, preferably perceptible by an operator outside the cabin, in the event of an overpressure inside the containment chamber 26.

Optionally, the alarm system 58 of the filling station 22 may comprise a sensor 63 disposed in the suction duct of the ventilation system 48 and an alarm 65 designed to emit an alarm signal in the event of a decrease in pressure of the intake air, a sign of clogging of the filtering device 52.

The alarm 65 associated with the sensor 63 is distinct from that associated with the sensor 60 disposed inside the confinement enclosure 26. As a variant, it may be the same alarm.

Between the filling station 22 and the outlet 12 of the furnace 6, the packaging unit 20 comprises a distributor 64 supplied with $UO_2$ powder by the furnace 6 and at least two storage jars 66 connected in parallel to the distributor 64 so selectively supplying one storage jar 66 at a time, each storage jar 66 being connected to the filling station 22 to supply the filling station 22 selectively from one of the storage jars 66 at a time.

The distributor 64 has a tank 68 for receiving the $UO_2$ powder.

Figure 3:
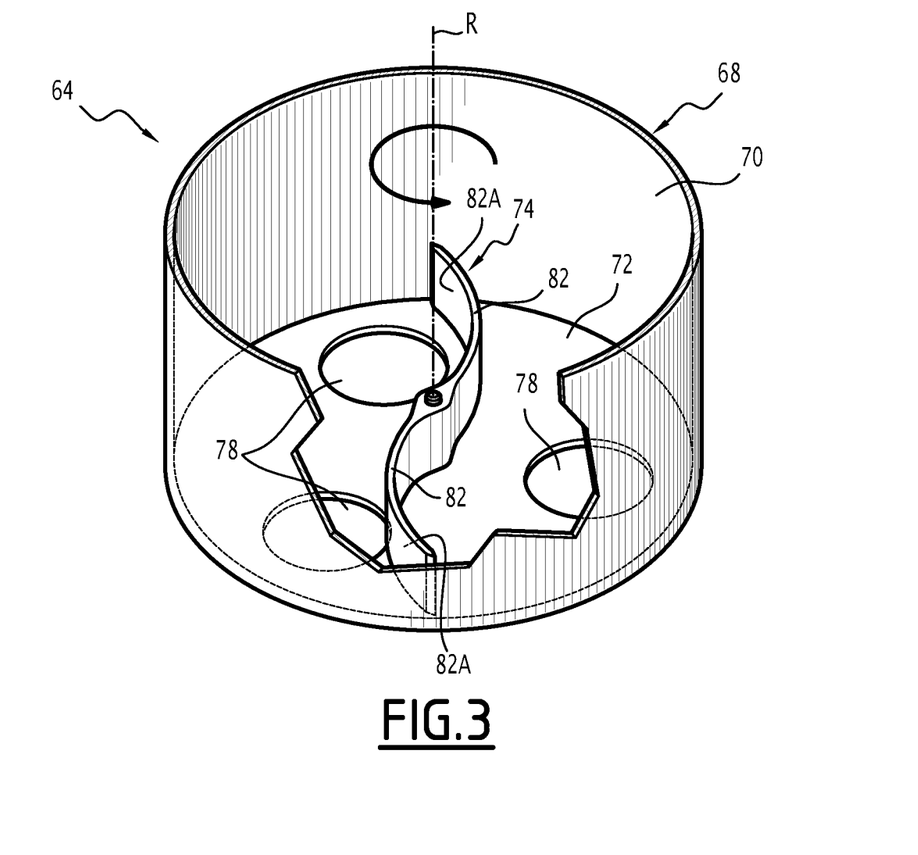
FIG. 3 is a detail view of a distributor of the nuclear fuel powder production installation of FIG. 1.

The supply station 20 has a neutral gas injection device 69 designed to inject an inert gas, preferably nitrogen ($N_2$) into the distributor 64, more precisely into the tank 68 of the distributor 64, in order to prevent the hydrogen gas ($H_2$) injected at the level of the outlet 12 from entering the tank 68. In fact, bringing the hydrogen gas into contact with the oxygen potentially present in the distributor 64 generates a risk of hydrogen explosion and therefore the dissemination of fissile material (uranium) and harmful products in the environment. As illustrated in FIG. 3, the tank 68 has a side wall 70, and a preferably flat bottom 72, while the dispenser 64 comprises a scraper 74 for scraping the bottom 72 of the tank 68. The scraper 74 is rotatably mounted relative to the bottom 72 and is coupled to a motor 76 (FIG. 1) for driving the scraper 74.

The bottom 72 of the tank 68 is provided with outlet openings 78, each outlet opening 78 supplying a respective storage jar 66.

The distributor 64 comprises a respective closure system 80 (FIG. 1) associated with each outlet opening 78 to open or close the respective outlet opening 78.

The scraper 74 is designed to push the $UO_2$ powder resting on the bottom 72 of the tank 68 towards the outlet openings 78 due to the rotation of the scraper 74.

As illustrated in FIG. 3, the side wall 70 is cylindrical centered on a central axis R and the bottom 72 comprises several outlet openings 78 (in this case three) distributed over the bottom 72. The outlet openings 78 are distributed here. preferably uniformly on an imaginary circle centered on the central axis R.

The scraper 74 is rotatably mounted about the central axis R. The scraper 74 comprises at least one scraper arm 82 extending radially and having a concave scraper face 82A.

The concavity of the scraper face 82A is such that the scraper face 82A extends radially outwards from the central axis R gradually away from a reference radius passing through the central axis R and the end of the scraping face 82A furthest from the central axis R, then gradually approaching said reference radius.

The portion furthest from said reference radius of each concave scraper face 82A is preferably located radially opposite the outlet openings 78. In other words, the portion furthest from said reference radius of each concave scraper face 82A traverses the imaginary circle along which the outlet openings 78 are located.

This shape allows the powder to be returned to the outlet openings 78 due to the rotation of the scraper 74. The powder located towards the center of the tank 68 is pushed back towards the periphery while the powder located towards the periphery of the tank 68 is brought back to the center of the tank 68.

This allows a complete emptying of the tank 68 without requiring the production or the supply of powder of $UO_2$ to be stopped.

The scraper 74 here has two diametrically opposed scraping arms 82. The scraper 74 has an S-shaped view along the central axis R. Alternatively, the scraper 74 may have a single scraper arm 82 or more than two scraper arms 82.

In the configuration shown, the tank 68 is circular, the outlet openings 78 are positioned in a circle, and the movement of the scraper 74 is circular.

More generally, the tank 68, the outlet openings 78 and the scraper 74 have geometries, positions and a movement designed to allow the complete emptying of the tank 68 without requiring the production or the supply of powder of $UO_2$ to be stopped.

The supply to each storage jar 66 is controlled by the closure system 80 controlling the opening of the outlet opening 78 feeding this storage jar 66.

Each storage jar 66 is provided for temporarily storing $UO_2$ powder before transferring it to the filling station 22 when the storage jar 66 is full, the stored powder is sufficiently cooled and an empty container 24 is in position for to be filled.

Each storage jar 66 is designed for cooling the $UO_2$ powder received in storage jar 66.

Each storage jar 66 has a gas cooling device 83 provided to generate a flow of gas through the storage jar 66. The gas is preferably an inert gas, for example nitrogen ($N_2$). This keeps the $UO_2$ powder in a neutral gas atmosphere and ensures its cooling.

Each gas cooling device 83 here comprises an injection device 84 for injecting neutral gas into the lower part of the storage jar 66 and a collection and filtration device 86 to recover and filter the neutral gas in the upper part of the storage jar 66.

Advantageously, the injection device 84 is designed for injection of the neutral gas in a homogeneous manner into the $UO_2$ powder received in the storage jar 66. This makes it possible in particular to extract the residual moisture which may be trapped in the powder, to avoid the compacting of the powder during its cooling and thus to fluidize the powder and facilitate its loading into a container 24. To do this, the injection device 84 comprises for example a porous diffuser made of sintered metal.

Each storage jar 66 has an outlet controlled by an outlet valve 85 controlling the flow of the $UO_2$ powder out of the storage jar 66. The outlet of each storage jar 66 is connected to an output worm screws 87 dedicated to this storage jar 66, the output worm screws 87 supplying a loading worm screw 88 provided to supply the filling duct 28 of the filling station 22 with the $UO_2$ powder.

The inlet of the filling line 28 is controlled by an inlet valve 90.

In operation, the reactor 4 and the furnace 6 are continuously supplied with reactive gases and continuously produce $UO_2$ powder. The $UO_2$ powder leaving the furnace 6 is collected by the distributor 64 which distributes the $UO_2$ powder in the storage jars 66 in a successive and cyclical manner. The dispenser 64 fills a storage jar 66 then proceeds to the next storage jar 66 until all of the storage jars 66 have been filled, then repeats this cyclically. The storage jars 66 are emptied as they are filled, so that they are not all filled simultaneously.

The $UO_2$ powder is cooled in each storage jar 66.

When the $UO_2$ powder contained in a storage jar 66 is cooled and a container 24 is ready to be filled, the outlet valve 85 of this storage jar 66 is opened to supply the output worm screw 87 of this storage jar 66, which in turn feeds the loading worm screw 88, which supplies the filling duct 28.

To supply a storage jar 66, the scraper 74 is rotated and the closure system 80 associated with the outlet opening 78 supplying this storage jar 66 is opened. Due to the rotation of the scraper 74, the powder is pushed to the open outlet opening 78 and flows to the storage jar 66.

Due to the flat design of the bottom 72 associated with a scraper 74, there is no dead zone in the distributor 64 in which the $UO_2$ powder could form a clump. Such a clump could lead to atmospheric contamination during maintenance intervention by an operator or to a risk of criticality.

The container 24 allows the $UO_2$ powder to be transferred, for example to a pelletizing station to form $UO_2$ pellets from the $UO_2$ powder, for example by sintering. In the illustrated configuration, it is necessary to turn the container 24 upside down to empty it and load the $UO_2$ powder into the pelletizing station.

Advantageously, the distributor 64 is designed to receive four storage jars 66 in parallel. While one of the four storage jars 66 is being filled, the second of the four storage jars 66 is cooling, the third of the four storage jars 66 is being emptied, and the fourth of the four jars storage 66 is empty. The fourth of the four storage jars 66 thus remains available in the event of an unplanned shutdown of the nuclear fuel powder production installation 1 to allow all of the fissile material present in the conversion installation 2 to be removed and to put the conversion installation 2 into safe shutdown conditions.

Figure 4:
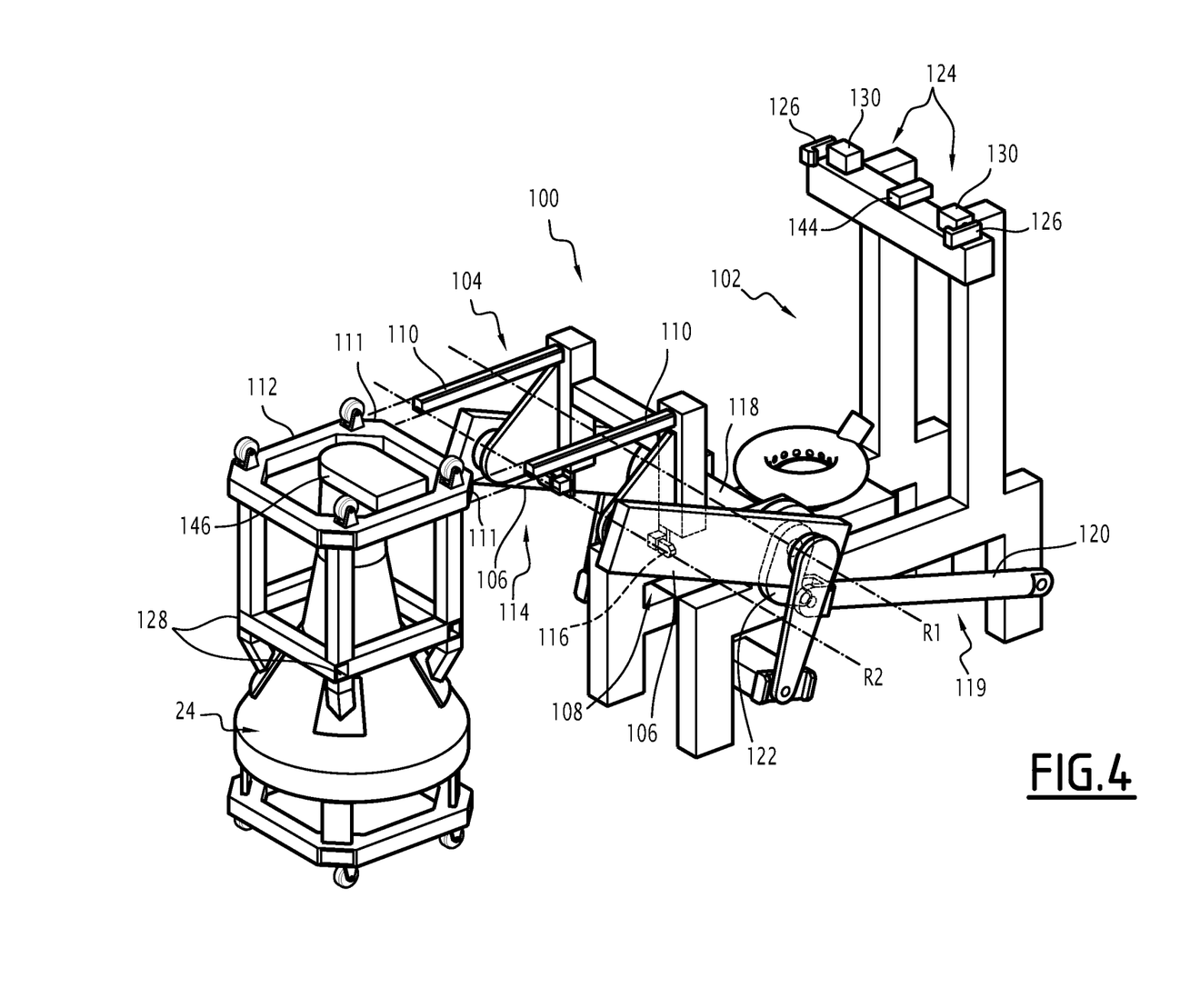
FIG. 4 is a schematic perspective view of a turning station of a container containing $UO_2$ powder.

As illustrated in FIG. 4, the nuclear fuel powder production installation 1 comprises an turning station 100 for inverting and emptying a container 24.

The turning station 100 comprises a frame 102, a container holder 104 for gripping a container 24, at least one lifting arm 106 pivotally mounted on the frame 102 about a first axis of rotation R1, the container holder 104 being rotatably mounted on the lifting arm 106 about a second axis of rotation R2 separate from the first axis of rotation R1 and parallel to the first axis of rotation R1, and a turning mechanism 108 to cause rotation of the container holder 104 relative to the lifting arm 106 only due to the rotation of the lifting arm 106 relative to the frame 102.

The container holder 104 comprises two lifting arms 110 provided to fit into recesses 111 of a frame 112 fixed to the container 24.

The container holder 104 comprises a locking device 114 comprising locking members 116 movable to fit into recesses (not visible) of the frame 112 in order to lock the container 24 sliding along the lifting arms 110.

The turning station 100 here comprises two lifting arms 106 coupled in rotation by a shaft 118. The shaft 118 is rotatably mounted on the frame 102 about the first axis of rotation R1, and the lifting arms 106 are fixed to the two ends of shaft 118, each lifting arm 106 being attached to a respective end of shaft 118.

The turning station 100 comprises a lifting system 119 for rotating the lifting arms 106 about the first axis of rotation R1. The lifting system 119 comprises an actuator 120 connected to the lifting arms 106 to rotate them about the first axis of rotation R1.

The actuator 120 is here a hydraulic jack having a first end connected to the frame 102 and a second end opposite the first end connected to a connecting rod 122 connected in rotation to the lifting arms 106. The connecting rod 122 is here fixed to the shaft. 118. Alternatively, the actuator 120 may be a pneumatic cylinder or an electric jack.

The frame 102 comprises a locking device 124 comprising locking members 126 movable to fit into locking recesses 128 of the frame 112 to immobilize the container 24 relative to the frame 102 when the container 24 is in the inverted position.

Each locking member 126 is controlled by a respective locking actuator 130. As shown in FIG. 4, the locking members 126 are moved apart to allow the inversion of the container 24 and are brought together to fit into the locking recesses 128 and block the inverted container 24.

Figure 5:
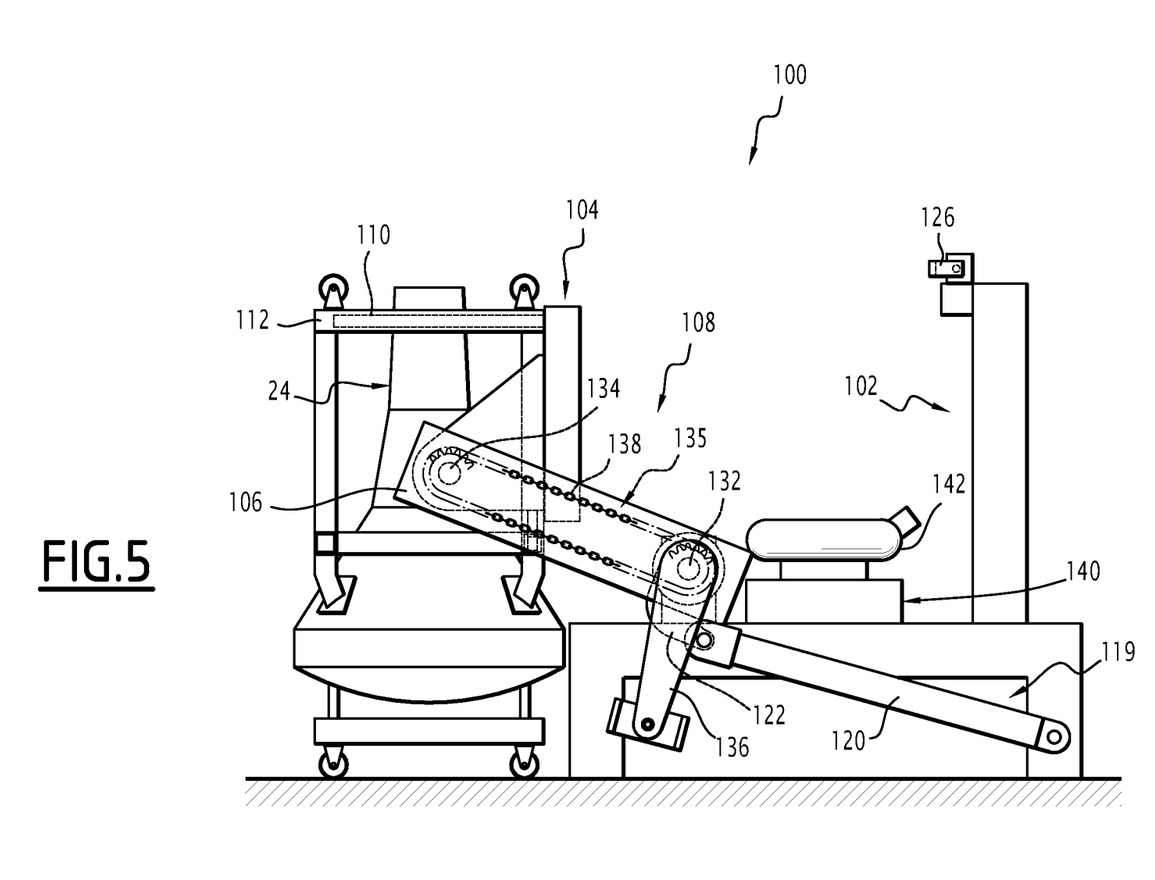
FIGS. 5 and 6 are schematic side views of the turning station of FIG. 4, the turning station being in two distinct configurations.
Figure 6:
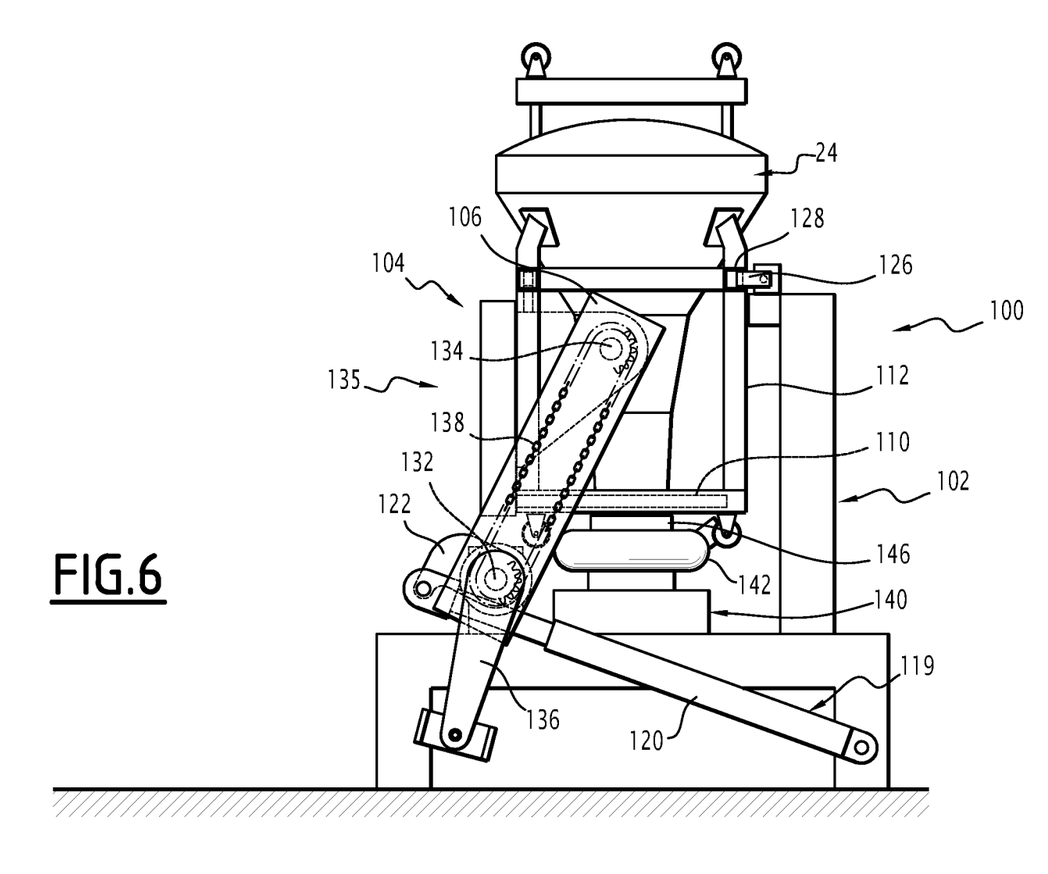

FIGS. 5 and 6 illustrate the turning station 100 respectively in a gripping position (FIG. 5) for gripping the container 24, and a turning position (FIG. 6) in which the container 24 is inverted. In FIG. 6, the container 24 is blocked by the locking device 124.

As may be seen in FIGS. 5 and 6, the turning mechanism 108 comprises a first pinion 132 rotatably mounted on the lifting arm 106 while being rotatably secured to the frame 102, a second pinion 134 rotatably mounted on the lifting arm 106 being rotatably secured to the container holder 104, and a drive mechanism 135 connecting the first pinion 132 to the second pinion 134.

The first pinion 132 is here connected in rotation to the frame 102 by means of a locking arm 136 having one end connected in rotation to the first pinion 132 and its other end fixed to the frame 102, so that the locking arm 136 and therefore the first pinion 132 are stationary in rotation with respect to the frame 102.

The drive mechanism 135 comprises, for example, a drive chain 138 passing over the first pinion 132 and the second pinion 134.

As the lifting arm 106 rotates, the first pinion 132 pivots relative to the lifting arm 106, so that the second pinion 134 also pivots relative to the lifting arm 106. The second pinion 134 arcs around the first pinion 132 while pivoting about its axis.

With this mounting configuration of the turning station 100, the simple rotation of the lifting arm 106 causes epicyclic movement of the container holder 104 and the container 24. The container holder 104 describes an arc of a circle around the axis of the rotation R1 at the same time as it rotates around the axis of rotation R2. This makes it possible to obtain the lifting and turning of the container 24 in one and the same movement. The control of the rotation of the container holder 104 is obtained in a simple and easy to implement manner.

The turning station 100 comprises a receiver 140 for receiving the powder exiting the returned container 24.

The turning station 100 is provided with a suction system similar to the suction system 32 of the filling station 22. The suction system of the turning station 100 comprises in particular a suction ring 142 through which the powder flows from the inlet opening 35 of the returned container 24 to the inlet of the receiver 140. The suction ring 142 is similar to that of the filling station 22.

As illustrated in FIG. 1, the turning station 100 comprises a presence sensor 144 to detect the presence of the container 24 in the inverted position. The presence sensor 144 is for example an inductive sensor. The presence sensor 144 is here arranged near the blocking device 124.

The blocking device 124 is designed to block the container 24 according to the signal provided by the presence sensor 144.

The container 24 is provided with an opening system 146 controlling the opening and closing of the container 24.

The turning station 100 is designed to control the opening system 146 of the container 24 as a function of the signal provided by the presence sensor 144, and in particular to control the opening of the container 24 only when the presence of the container 24 in the inverted position is detected by the presence sensor 144.

The turning station 100 is designed to activate suction through the suction ring 142 based on the signal provided by the presence sensor 144. The suction through the suction ring 142 is activated only when the presence of the inverted container 24 is detected.

Optionally, the turning station 100 may comprise an inflatable seal for docking the container 24 with the receiver 140. This ensures a sealed docking taking into account positioning tolerances.

The turning station 100 allows safe handling of the container 24 with minimal human intervention. In addition, the turning station 100 is simple, robust and easy to clean. The inversion mechanism 108, using a hydraulic or pneumatic actuator 120 to simultaneously lift and invert the container 24, allows a smooth inversion of the container 24, ensuring complete emptying of the $UO_2$ powder, without leaving any powder in the container 24. and without dispersing any powder during the transfer of powder from the container 24 into the receiver 140.

The nuclear fuel powder production installation 1 as a whole allows the production and supply of $UO_2$ powder, in particular to a $UO_2$ pellet production station, during production and during maintenance operations, in limiting the formation of clumps in the conversion installation 2 and limiting the dispersion of $UO_2$ powder into the atmosphere during emptying and filling the containers 24.

What is claimed is:

1. An installation for the production of nuclear fuel powder comprising:
    a conversion installation configured for converting of uranium hexafluoride ($UF_6$) into uranium dioxide ($UO_2$), the conversion installation comprising:
        a hydrolysis reactor configured for converting $UF_6$ into uranium oxyfluoride powder ($UO_2F_2$) by reaction between gaseous $UF_6$ and dry water vapor injected into the hydrolysis reactor; and
        a pyrohydrolysis furnace configured for converting the $UO_2F_2$ powder into $UO_2$ powder by reacting the $UO_2F_2$ powder with dry water vapor and gaseous hydrogen ($H_2$) circulating in the pyrohydrolysis furnace; and
    a packaging unit for the $UO_2$ powder, the packaging unit comprising a filling station for filling a container with $UO_2$ powder, the filling station comprising a containment chamber, a filling duct supplied with $UO_2$ powder from the pyrohydrolysis furnace and having an outlet opening into the containment chamber, and a suction system comprising a suction ring disposed at the outlet of the filling duct for sucking an annular air flow around a stream of $UO_2$ powder falling from the outlet of the filling duct into the container.

2. The installation according to claim 1, wherein the filling station comprises a ventilation system for depressurizing the containment chamber and sucking and filtering the air present in the containment chamber.

3. The installation according to claim 1, wherein the containment chamber is a cabin comprising a door for introducing or extracting the containment container in or out of the cabin.

4. The installation according to claim 1, further comprising an alarm system comprising a sensor disposed in the containment chamber for measuring the pressure in the containment chamber and an alarm to emit an alarm signal in the event of an overpressure inside the chamber.

5. The installation according to claim 1, wherein the containment chamber is equipped with a radioactive contamination control device disposed in the containment chamber to achieve a control of contamination inside the containment chamber.

6. The installation according to claim 1, further comprising at least two storage jars for $UO_2$ powder and a distributor for distributing the $UO_2$ powder successively to the storage jars, the filling duct being supplied successively from the storage jars.

7. The installation according to claim 6, wherein the distributor has a tank with a flat bottom and at least one scraper for scraping the bottom of the tank.

8. The installation according to claim 7, wherein the distributor comprises outlet openings for the $UO_2$ powder formed in the bottom of the tank, each outlet opening supplying a respective storage jar.

9. The installation according to claim 6, further comprising a neutral gas injection device configured to inject an inert gas inside the distributor.

10. The installation according to claim 1, further comprising a turning station for inverting and emptying a container filled with $UO_2$.

11. The installation according to claim 10, wherein the turning station comprises a suction system comprising a suction ring disposed to be located near an inlet opening of a container inverted by the turning station.

12. The installation according to claim 10, wherein the turning station comprises a frame, a container holder for gripping the container, at least one lifting arm pivotally mounted on the frame and carrying the container holder, and a turning mechanism for controlling rotation of the container holder relative to the lifting arm, the turning mechanism being configured so that rotation of the lifting arm relative to the frame causes the container holder to rotate relative to the lifting arm.

13. The installation according to claim 12, wherein the turning mechanism comprises a first pinion rotatably mounted on the lifting arm while being rotatably secured to the frame, a second pinion rotatably mounted on the lifting arm while being rotatably secured to the container holder, and a drive mechanism connecting the first pinion to the second pinion.

14. The installation according to claim 12, wherein the turning station comprises a locking device disposed on the frame for locking the container in the inverted position.

15. The installation according to claim 10, wherein the turning station comprises a presence sensor for detecting the presence of the container in the inverted position, the container comprising an opening system for opening or closing the container, the turning station being designed to open the opening system only when the presence of the container in the inverted position is detected by the presence sensor.

16. The installation according to claim 1, further comprising a seal disposed at the inlet of the pyrohydrolysis furnace, a seal disposed at the outlet of the pyrohydrolysis furnace and/or a seal disposed between the hydrolysis reactor and a transfer device designed to transfer the $UO_2F_2$ powder from the hydrolysis reactor to the pyrohydrolysis furnace, the installation being designed for pressurizing the or each seal with an inert gas.

17. The installation according to claim 16, wherein the inert gas is nitrogen ($N_2$).

18. The installation according to claim 1, wherein the installation is configured for the injection of an inert gas into the hydrolysis reactor for carrying out the conversion of $UF_6$ into $UO_2F_2$ powder in an inert gas atmosphere.

19. The installation according to claim 18, wherein the inert gas is nitrogen ($N_2$).

\* \* \* \* \*